United States Patent
Calabro et al.

(10) Patent No.: US 9,584,250 B2
(45) Date of Patent: Feb. 28, 2017

(54) SYMBOL TIMING ESTIMATION FOR COHERENT POLARIZATION MULTIPLEX OPTICAL RECEIVERS

(71) Applicant: Xieon Networks S.a.r.l., Luxembourg (LU)

(72) Inventors: Stefano Calabro, Munich (DE); Christina Hebebrand, Kiel (DE); Werner Rosenkranz, Laboe (DE); Bernhard Spinnler, Oberhaching (DE)

(73) Assignee: Xieon Networks S.a.r.l., Luxembourg (LU)

(*) Notice: Subject to any disclaimer, the term of this patent is extended or adjusted under 35 U.S.C. 154(b) by 32 days.

(21) Appl. No.: 14/369,857

(22) PCT Filed: Dec. 28, 2012

(86) PCT No.: PCT/EP2012/077019
§ 371 (c)(1),
(2) Date: Jun. 30, 2014

(87) PCT Pub. No.: WO2013/098369
PCT Pub. Date: Jul. 4, 2013

(65) Prior Publication Data
US 2014/0369685 A1 Dec. 18, 2014

(30) Foreign Application Priority Data
Dec. 30, 2011 (EP) .................. 11196231

(51) Int. Cl.
*H04B 10/20* (2006.01)
*H04B 10/06* (2006.01)
(Continued)

(52) U.S. Cl.
CPC .............. *H04J 14/06* (2013.01); *H04B 10/61* (2013.01); *H04B 10/614* (2013.01);
(Continued)

(58) Field of Classification Search
CPC .... H04B 10/60; H04B 10/613; H04B 10/229; H04J 14/06
(Continued)

(56) References Cited

U.S. PATENT DOCUMENTS 5,471,508 A * 11/1995 Koslov ............... H04L 27/3872
375/261
6,430,235 B1 * 8/2002 O'Shea .................. H04L 7/007
370/516
(Continued)

FOREIGN PATENT DOCUMENTS

| DE | WO 2011100867 A1 * | 8/2011 | ............. H04L 7/027 |
| WO | 2011/022869 A1 | 3/2011 | |
| WO | 2011/100867 A1 | 8/2011 | |
| WO | 2013/098369 A1 | 7/2013 | |

OTHER PUBLICATIONS

International Search Report for Application No. PCT/EP2012/077019, 3 pages, dated Apr. 5, 2013.

*Primary Examiner* — David Payne
*Assistant Examiner* — Pranesh Barua
(74) *Attorney, Agent, or Firm* — Nelson Mullins Riley & Scarborough LLP

(57) ABSTRACT

A received POLMUX signal is rotated by fixed rotation parameters (Rot0, Rot1, Rot2) and the rotated POLMUX signal with optimal signal performance is selected and phase information is derived from both polarities. A pre-filter improves the timing accuracy.

14 Claims, 9 Drawing Sheets

(51) Int. Cl.
- *H04J 14/06* (2006.01)
- *H04B 10/61* (2013.01)
- *H04L 7/027* (2006.01)
- *H04L 27/26* (2006.01)
- *H04L 25/03* (2006.01)

(52) U.S. Cl.
CPC ......... *H04B 10/6165* (2013.01); *H04L 7/027* (2013.01); *H04L 27/2662* (2013.01); *H04L 27/2672* (2013.01); *H04L 27/2697* (2013.01); *H04B 10/6166* (2013.01); *H04L 25/03044* (2013.01); *H04L 25/03891* (2013.01)

(58) Field of Classification Search
USPC .................................. 398/65, 202, 205, 208
See application file for complete search history.

(56) References Cited

U.S. PATENT DOCUMENTS

| | | | |
|---|---|---|---|
| 2003/0186666 A1* | 10/2003 | Sindhushayana | H04L 7/0054 455/260 |
| 2010/0329677 A1* | 12/2010 | Kaneda | H04B 10/60 398/65 |
| 2011/0150503 A1* | 6/2011 | Winzer | H04B 10/60 398/202 |
| 2011/0268459 A1* | 11/2011 | Rollins | H04B 10/299 398/208 |
| 2012/0185523 A1* | 7/2012 | Hauske | H04B 10/25133 708/300 |
| 2012/0308234 A1* | 12/2012 | Bianciotto | H04B 10/614 398/65 |
| 2013/0039665 A1* | 2/2013 | Hauske | H04L 7/027 398/202 |

* cited by examiner

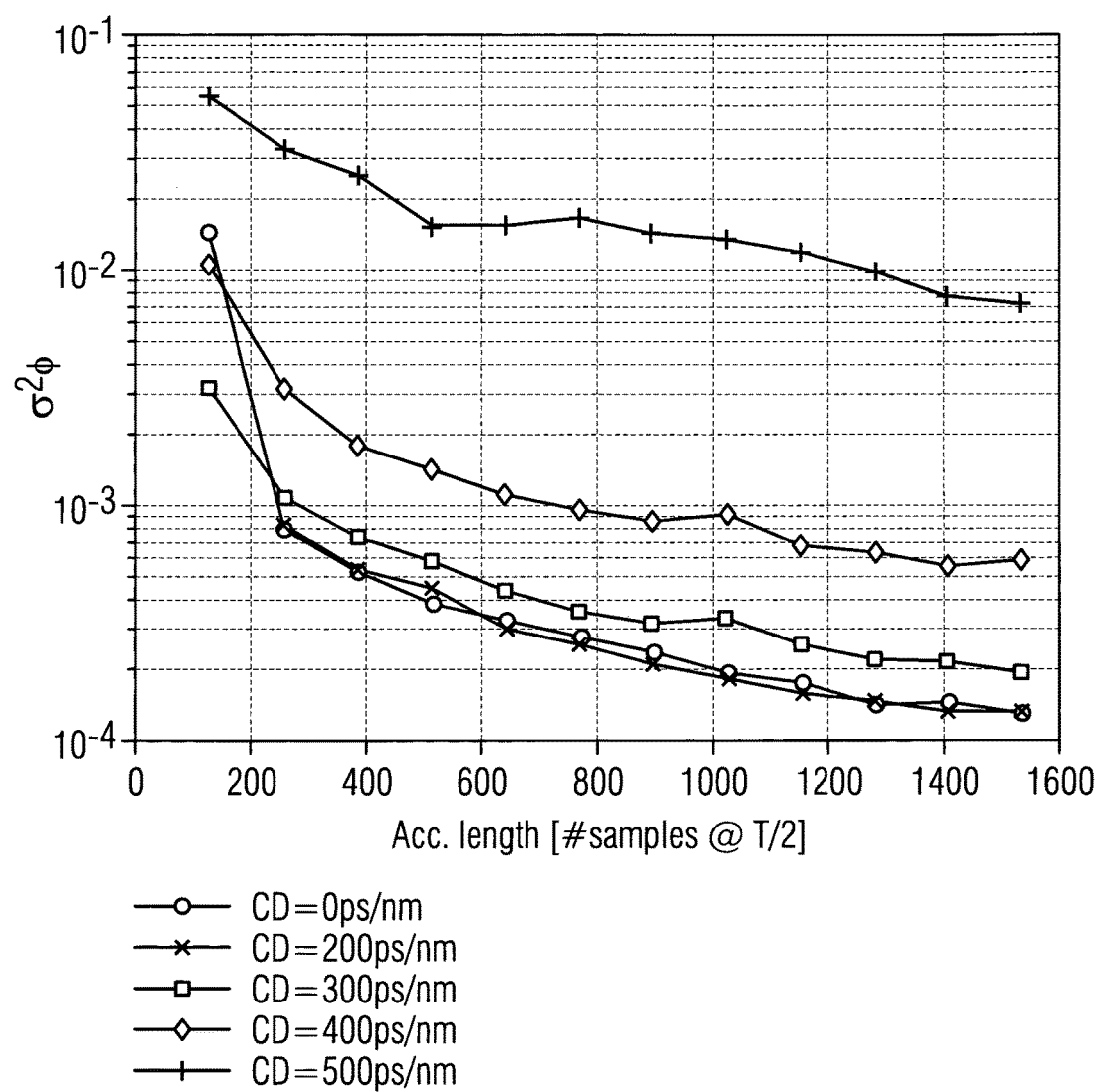

SYMBOL TIMING ESTIMATION FOR COHERENT POLARIZATION MULTIPLEX OPTICAL RECEIVERS

CROSS REFERENCE TO RELATED APPLICATIONS

This application is a U.S. National Phase Application under 35 U.S.C. 371 of International Application No. PCT/EP2012/077019, filed on Dec. 28, 2012, which in turn claims priority to European Patent Application No. 11196231.2, filed Dec. 30, 2011, both of which are incorporated herein by reference in their entireties.

FIELD OF THE INVENTION

The invention relates to a method and an arrangement for retrieving symbol timing information in an optical POLMUX (POLarization MUltipleX) network. In particular, the invention relates to symbol timing estimation for coherent polarization multiplex optical receivers without polarization control.

BACKGROUND OF THE INVENTION

Modern optical communications over single-mode fibers employ polarization multiplex (polmux) to double the spectral efficiency. After linear opto-electrical conversion, a "coherent" receiver de-multiplexes the polarizations and mitigates the relevant transmission impairments by digital means. Recently, both single-carrier and multi-carrier polmux transmission have drawn the interest of the optical community.

A prerequisite for correct processing at the receiver is correct symbol timing acquisition. This invention focuses on symbol timing synchronization for single-carrier coherent polmux receivers employing linear modulation.

Symbol timing recovery consists in estimating and correcting the frequency difference and the relative jitter of transmit and receive symbol clocks. In a high-speed system this is a critical task because the frequency components of the timing jitter extend into the high-frequency region. Tracking and compensating them poses challenging requirements for the bandwidth of the timing recovery circuitry.

In an optical coherent receiver accurate knowledge of the transmit symbol timing is a prerequisite for many processing tasks. Whereas a rough compensation of the bulk chromatic compensation can be performed before symbol timing synchronization, receiver tasks as adaptive equalization of PMD and residual CD, compensation of the carrier phase noise, and detection of the transmit data are conveniently performed after symbol timing acquisition.

The receiver depicted in FIG. 1 uses an adaptive Multiple Input Multiple Output (MIMO) equalizer to compensate residual CD and PMD. It estimates the timing error after the MIMO equalizer and corrects the sampling frequency before it. This architecture guarantees that the adaptive equalizer works with a synchronously sampled signal and, at the same time, that the timing error detector receives a clean signal after compensation of PMD and residual CD. Unfortunately, this solution requires the implementation of a long feedback loop embedding a component (the MIMO equalizer) that has a high latency. The long loop delay limits the bandwidth of the clock recovery and, therefore, its ability to track fast jitter.

On the contrary, the architecture illustrated in FIG. 2 is free of feedback loops and can potentially attain a high tolerance to timing jitter. However, it exposes the symbol timing recovery to a large portion of the signal impairments. As a consequence, the symbol timing recovery must be capable of extracting the timing information from a signal impaired by PMD and residual CD. The invention addresses the challenge of developing a robust timing phase estimator that can be used in the feed-forward architecture of FIG. 2.

A symbol timing recovery capable of tolerating PMD has been proposed in the patent application EP2375603. However, the described method and arrangement rely upon a feedback architecture (a phase-locked loop). The limited speed of digital electronics limits the loop bandwidth and thus the jitter tolerance. Consequently, this solution may not be suited for high-speed communications.

BRIEF DESCRIPTION OF THE DRAWINGS

The invention is explained by way of example in more detail below with the aid of the attached drawings.

FIG. 9 is a schematic representation of the variance of the phase estimate as a function of the accumulation time for several values of residual CD according to an embodiment of the invention.

DESCRIPTION OF THE INVENTION

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An embodiment of the invention includes a timing phase estimator capable of extracting timing information from a signal impaired by PMD and residual Chromatic Dispersion (CD).

The novel phase estimator uses a bank of fixed pre-configured polarization rotators to provide a standard timing phase estimator with enhanced robustness against transmission impairments. Suggested is e.g. a phase estimator incorporated by reference as described by M. Oerder, and H. Meyr, "Digital Filter and Square Timing Recovery", IEEE Trans. on Comm., vol. 36, no. 5, May 1988.

The polarization rotators generate a set of tentative signals with partially compensated PMD. At any time the most suited signal within the set is identified and further processed for timing phase estimation. Appropriate means are defined to avoid discontinuities in the phase estimation, which might result as a consequence of the selection approach. Optionally, a pre-filter can be used to improve the accuracy of the clock recovery and enhance the CD tolerance.

A bank of predefined PMD equalizers computes a collection of tentatively compensated signals. The parameters of the rotators are chosen in such a way that under any channel conditions at least one resulting signal contains useful timing information.

Figure 1:
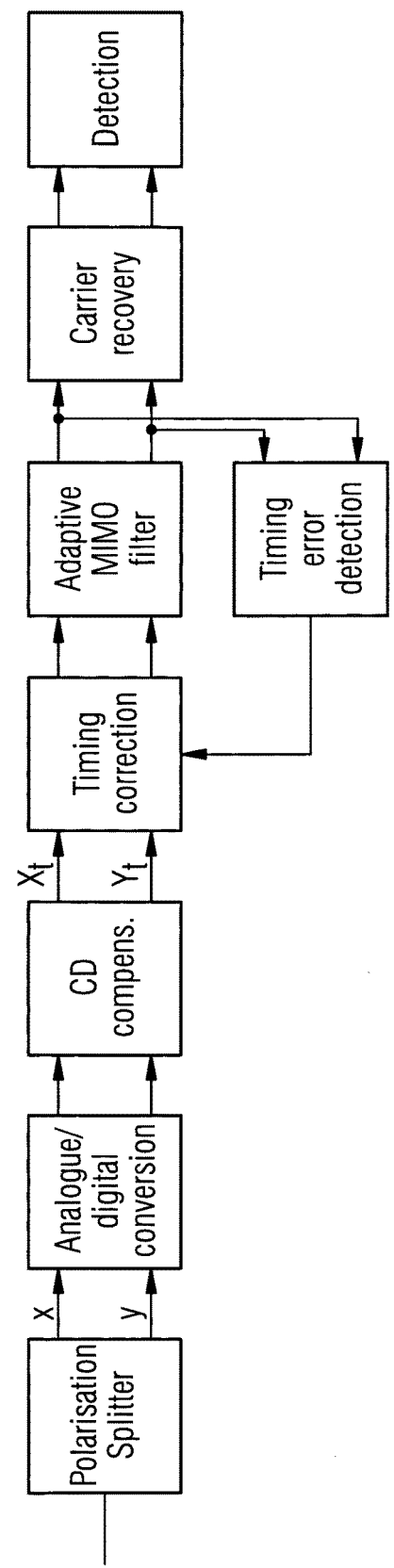
FIG. 1 is a schematic representation of a coherent polmux receiver with feedback symbol timing recovery.
Figure 2:
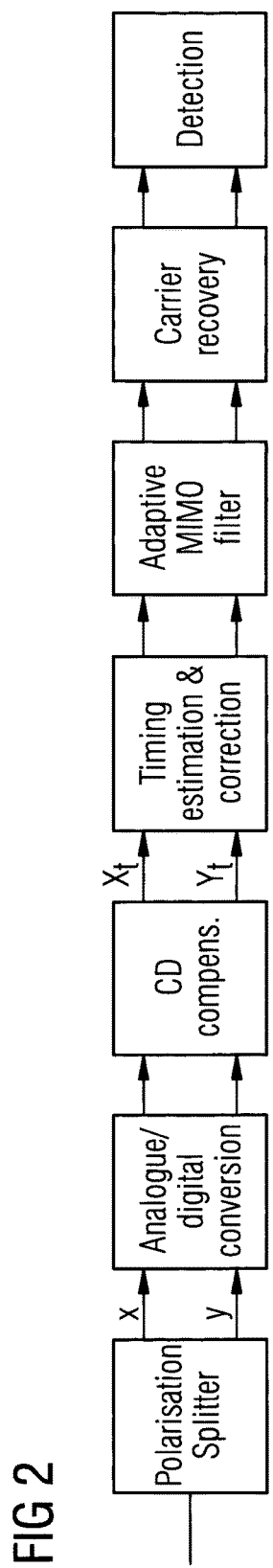
FIG. 2 is a schematic representation of a coherent polmux receiver with feedforward symbol timing recovery.
Figure 3:
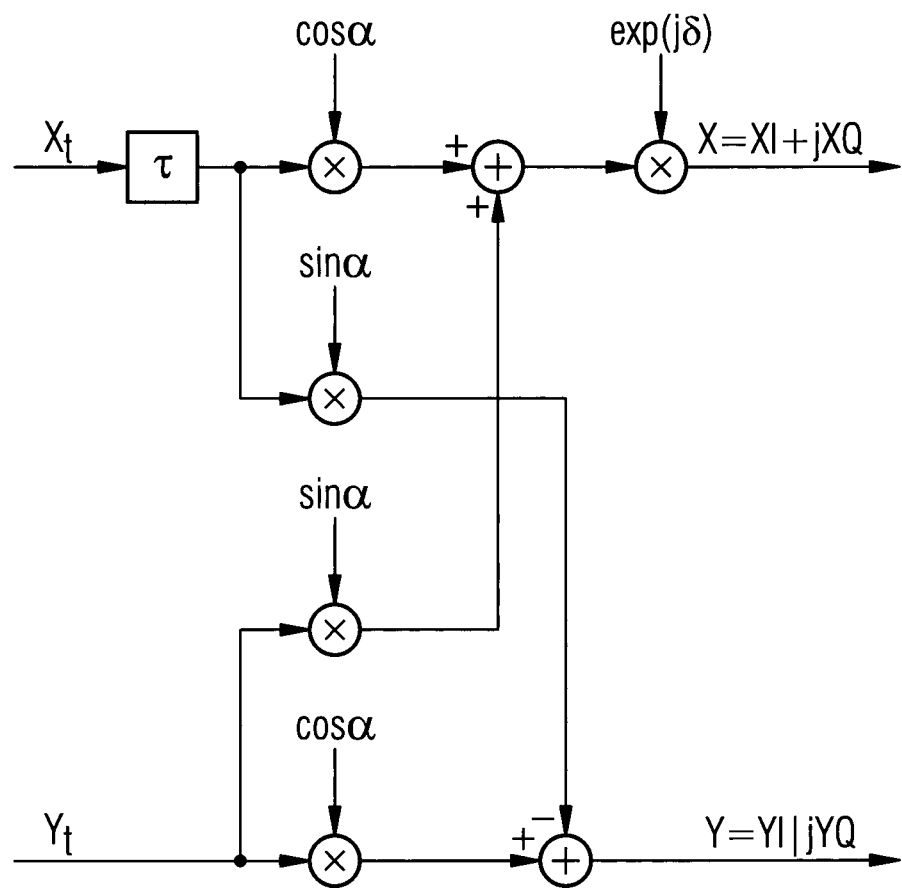
FIG. 3 is a schematic representation of the first order PMD element according to an embodiment of the invention.
Figure 4:
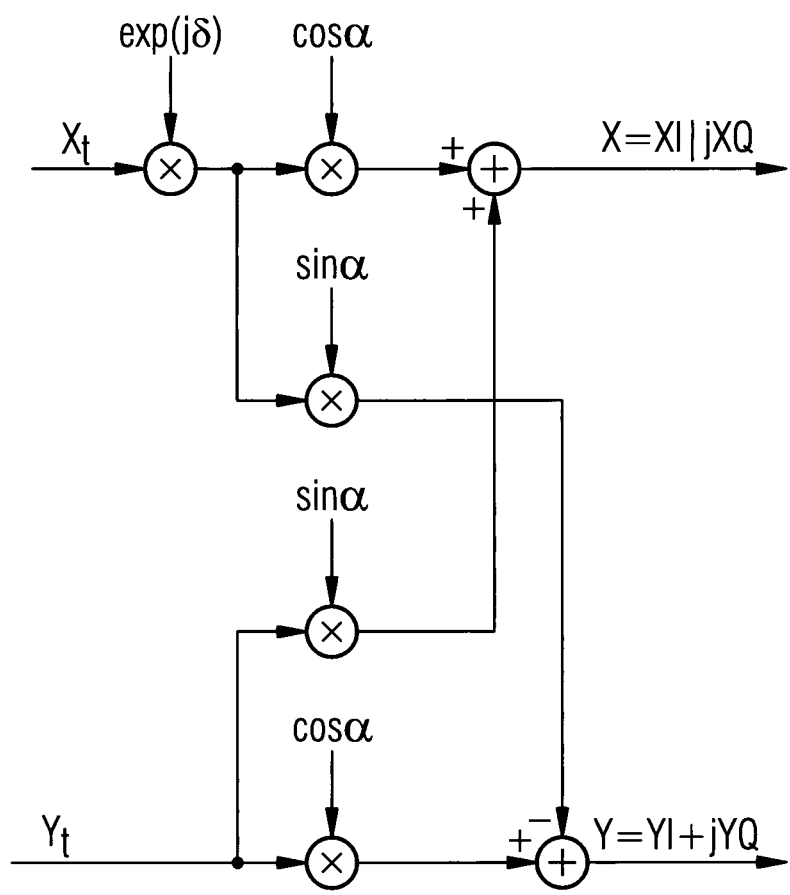
FIG. 4 is a schematic representation of the polarization rotator according to an embodiment of the invention.

If consideration is restricted to first order PMD and adopt the model of a transmission line depicted in FIG. 3, the bank of polarization rotators must be able to produce at least a useful signal (i.e. a signal containing timing information) for any combination of the Differential Group Delay (DGD) "$\tau$", the polarization mixing angle $\alpha$ and the polarization ellipticity angle $\delta$. It is easy to verify that in this case one possible choice for the PMD equalizers are polarization rotators of the type illustrated in FIG. 4 for digital samples $X_t$, $Y_t$. At least three rotators (including zero rotation) are necessary. Convenient rotation parameters are $$\text{Rot0:} \begin{cases} \alpha = 0 \\ \delta = 0 \end{cases} \quad (1)$$

$$\text{Rot1:} \begin{cases} \alpha = \pi/4 \\ \delta = 0 \end{cases}$$

$$\text{Rot2:} \begin{cases} \alpha = \pi/4 \\ \delta = \pi/2 \end{cases}$$

or corresponding parameters resulting in comparable distributed polarizations. The signals computed in the rotator bank are sent to a conventional timing phase estimator without enhanced PMD tolerance. Preferred is the timing estimator described above by M. Oerder, and H. Meyr.

In theory, the timing phase estimator is provided with an adaptive weighted combination of the tentative signals to obtain the best estimation of the timing phase. However, adaptation of the combination coefficients might suffer from convergence difficulty and, in the presence of fast polarization changes over the channel, might result into a mismatch of the weights.

As an alternative, it is possible to resort to a weighted combination with fixed coefficients (e.g. uniform weights). However, for any choice of the weights it is possible to find a combination of $\tau$, $\alpha$ and $\delta$ such that the timing information in the combined signal vanishes. Further, a fixed combination has the additional drawback of mixing all tentative signals, regardless of whether they contain useful timing information or not. Obviously, mixing signals that do not contain useful timing information only enhances the estimation noise.

Figure 5:
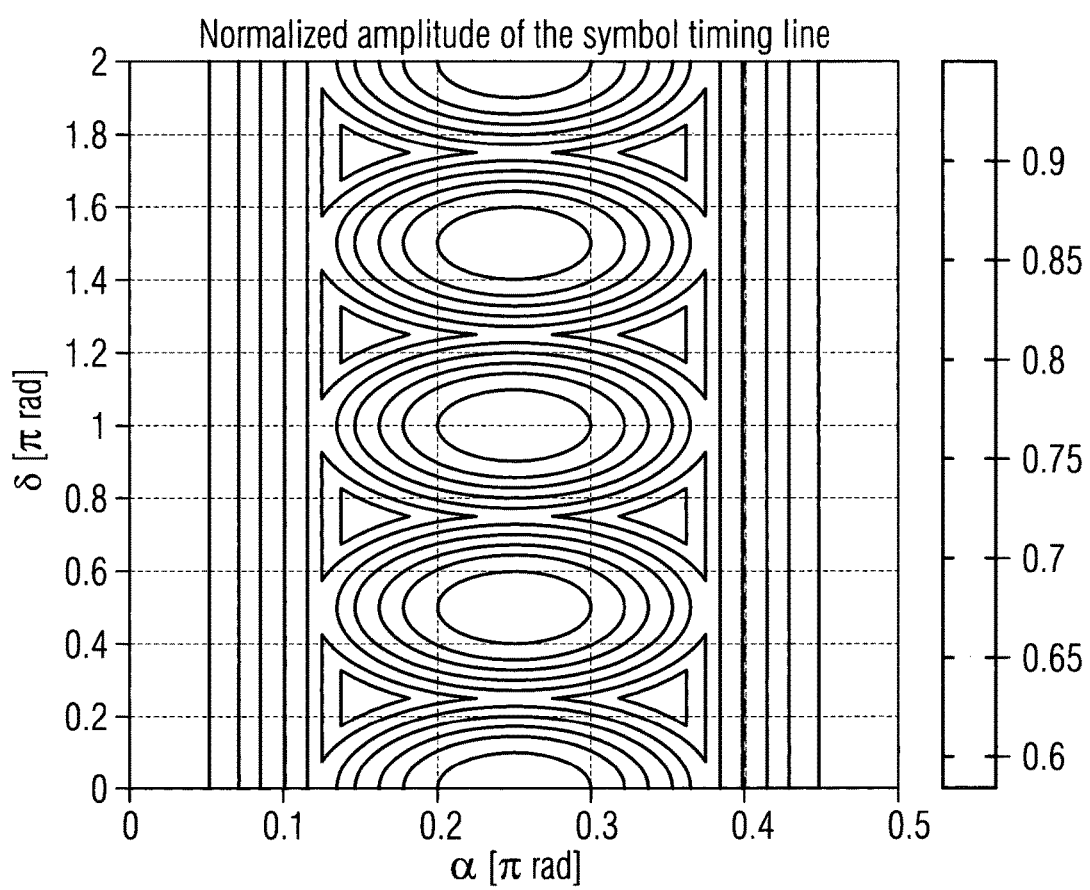
FIG. 5 is a schematic representation of the normalized amplitude of the recovered symbol timing line in the case of first order PMD with DGD equal to half a symbol period according to an embodiment of the invention.

To circumvent these problems, a selection approach is used to identify the "best" signal containing timing information. Pure selection is very fast and does not suffer from mismatch problems and convergence difficulties. Also, it is able to deliver useful timing information for any combination of $\tau$, $\alpha$ and $\delta$, as illustrated in FIG. 5 for the worst case represented by a DGD of half a symbol duration. The power of the symbol timing line (i.e. the spectral line containing the timing information) in the presence of first order PMD does not drop below 58% of its maximum value and is always sufficient to extract reliable timing phase estimates. By using more than three rotators the maximum line drop can be further reduced.

However, the selection algorithm may generate discontinuities of the phase estimation over time. The discontinuities occur in concurrence with a polarization swap at the output of one or more polarization rotators. A polmux signal entails two signals $s_x$ and $s_y$ associated at the transmitter with two orthogonal polarizations. In the presence of DGD, each polmux signal arrives at the receiver with a different timing phase. The received POLMUX signal is split into 2 orthogonal polarities with associated POLMUX signal components x and y. Ideally, the best rotator is able to separate the two signals $s_x$ and $s_y$, and provide each of them through one of its output ports. For the sake of example, it is assumed that the rotator yields signal $s_x \rightarrow X_t$ through port X and signal $s_y \rightarrow Y_t$ through port Y (FIG. 4: The ports carry the names of the output signals). When the selection algorithm indicates a new rotator to be the best one, two possible situations may occur. If the second rotator still provides prevailing $X_t$ through port X and $Y_t$ through port Y, no discontinuity of the estimated timing phase is observed. However, if the second rotator swaps the assignment of the data streams to the output ports, port Y conveys now the timing information of the $X_t$ stream whereas port X that of the $Y_t$ stream. In this case both estimated timing phases exhibit a discontinuity in concurrence with the selection of the new rotator.

Of course, a polarization swap might be detected and the connection of the X and Y ports might be exchanged. However, this solution requires additional complexity and, more importantly, is error prone due to the finite probability of false detection of the swap events.

A better approach to avoid the discontinuity consists in averaging the timing phase estimates for both polarizations. The averaged phase is obviously insensitive to polarization swaps and does not exhibit discontinuities. It is observed, that the fact that the averaged timing phase does not correspond to either polmux signal is irrelevant, because the timing phase correction occurs before polarization demultiplexing i.e. before the MIMO equalizer). At this point the two polmux signals are still mixed and it would not be possible anyway to apply the respective timing phase separately to each of them. Therefore, the symbol timing recovery synchronizes the timing frequency and tracks the timing jitter but it is the fractionally spaced MIMO equalizer that must shift the timing phase to the optimal sampling point.

In many designs, the CD compensator performs only a rough compensation of the bulk CD. The residual CD is compensated by the MIMO equalizer. This means that the symbol timing recovery must exhibit some CD tolerance. A possibility to improve the CD tolerance consists in supplying the bank of equalizers also with CD mitigation capabilities. In this case, the bank shall contain besides the PMD equalizers also appropriate CD equalizers. An alternative solution is obtained by applying a prefilter before the symbol timing recovery. The use of a prefilter in an analogue timing recovery is known in the art as a means to suppress pattern noise. A prefilter with a high-pass frequency response is employed in an embodiment of the present invention and found as particularly effective in extending the CD tolerance of the clock recovery.

Figure 6:
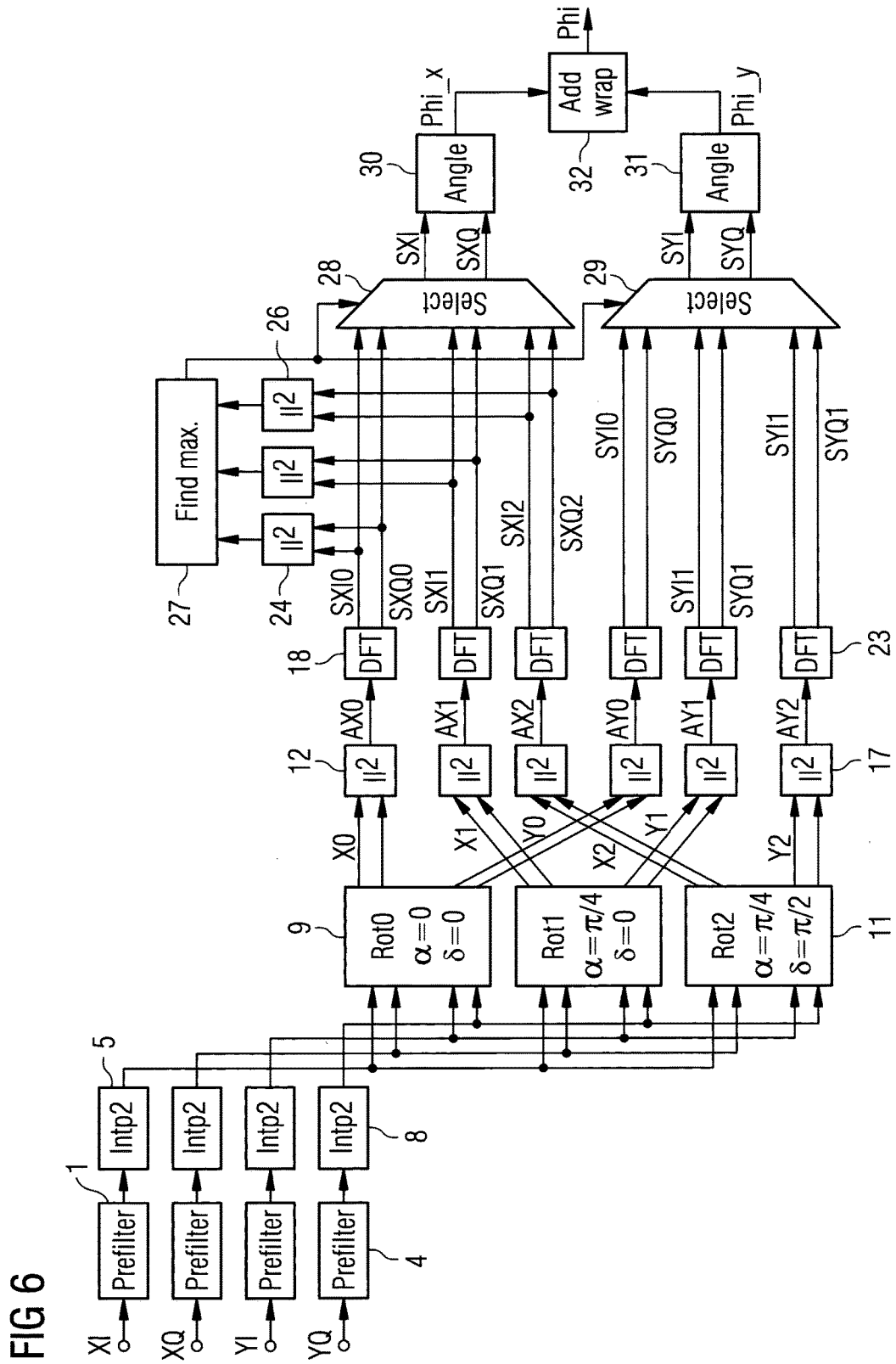
FIG. 6 is a schematic representation of the implementation of the timing phase estimator according to an embodiment of the invention.

FIG. 6 illustrates the preferred implementation of the timing phase estimator. The arrangement of FIG. 6 can be interpreted as an enhanced digital squarer timing phase estimator. The original squarer consists of the blocks 5-8 "Intp2", the bank of polarization rotators 9-11, the quadratic nonlinearities or squarer 12-17, the DFT units 18-23, further squarer 24-26, the maximum detector 27, selector circuits 28, 29, the phase information extractors ("Angle" blocks) 30, 31, and the phase information adder 32 The extension includes prefilters 1-4.

The in-phase and quadrature components XI, XQ; YI, YQ of the received and polarisation split and A/D converted polmux signal components x, y are assumed to be sampled with approximately two samples per symbol and A/D converted. To emphasize that the arrangement is suited for high-speed implementation, signal busses conveying dop (i.e. degree of parallelization) samples in parallel are considered. As a special case, in a serial implementation the degree of parallelization (dop) is one.

As discussed above, a high-pass prefilter 1-4 is applied to every signal component to enhance the CD tolerance of the timing phase estimator. Since the digital squarer requires four samples per symbol the missing intermediate samples are generated by means of the interpolation blocks ("Intp2"). After interpolation, each bus transports 2·dop samples. Alternatively, if the input signals are already sampled with approximately four samples per symbol, the "Intp2" blocks are not required.

The four polmux signal components $(X_t=)$ XI, XQ; $(Y_t=)$ YI, YQ are subsequently processed by the bank of polarization rotators 9-11. The three rotators 9-11 implement the model of FIG. 4 with the parameters of equation (1). In particular, the first rotator 9 ("Rot0") leaves the signals unchanged and therefore does not consume any digital resources.

All rotated (polmux) signal components X0, Y0; X1, Y1; X2, Y2 (FIG. 6) with X0=XI0, XQ0; Y0=YI0, YQ0; X1=XI1, XQ1; Y1=YI1, YQ1; X2=XI2, XQ2; Y2=YI2, YQ2 are sent to squarers 12-17 (quadratic nonlinearities) that compute the squared magnitude of every complex sample. For any polarization X, Y and any rotator Rot0, Rot 1, Rot 2 a different sequence AX0, AX1, AX2 (x-polarisation) and AY0, AY1, AY2 (y-polarisation) of squared amplitudes is obtained.

Figure 7:
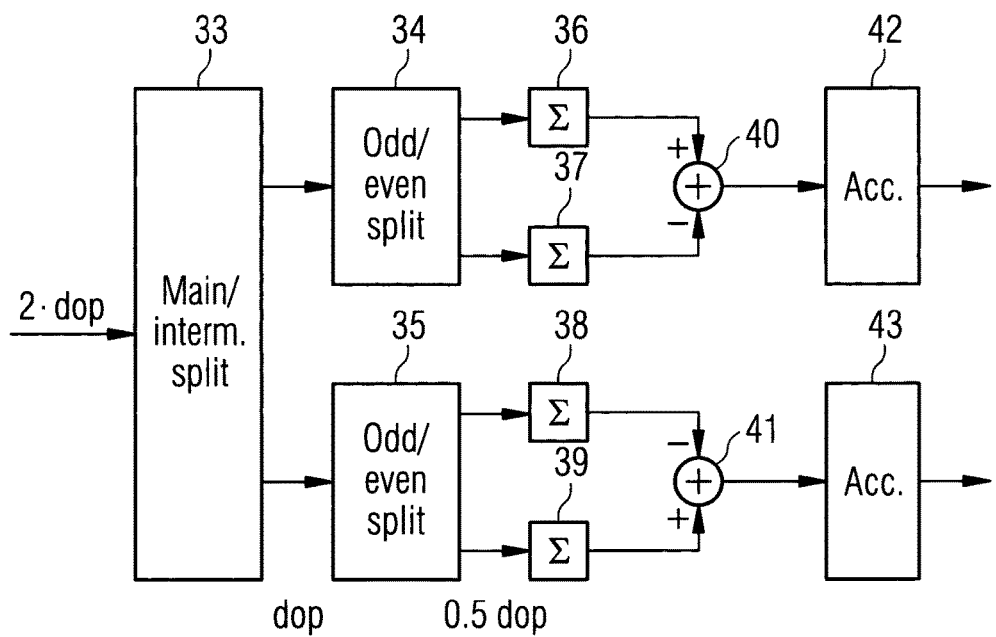
FIG. 7 is a schematic representation of the implementation of the DFT block according to an embodiment of the invention.

Subsequently, the downstream DFT units 18-23 compute complex coefficients at symbol rate of the Discrete Fourier Transform (DFT) of the sequences of squared amplitudes. The implementation of the DFT blocks is depicted in FIG. 7. The input sequences are first reordered in main/intermediate samples (upper and lower outputs of 33) and than divided in odd/even samples (upper and lower out put of 34 and 35 respectively). The summed odd and even split samples of the main samples are subtracted. The results are accumulated in a first accumulator block 42. The summed intermediate samples are also subtracted and the results accumulated in a second accumulator block 43 over a predefined number of samples to provide the real and imaginary part of the DFT coefficients (the necessary multiplication of the samples with +1 and −1 is obtained by subtraction of the even samples). The result is an accumulated complex coefficient representing a spectral line corresponding to the received data symbol rate.

The selection algorithm operates on the magnitude of the DFT coefficients. To this end it is sufficient to regard only one polarization, e.g. in FIG. 6 only the X polarization is considered. To determine the maximum the complex output values SXI0, SXQ0; SXI1, SXQ1; SXI2, SXQ2 of the DFT units 18-20 are squared in the squarer units 24-26 and the amplitudes fed to the maximum detector 27. The DFT coefficient with the maximum amplitude corresponding to the spectral line of the received data symbols is determined and the corresponding POLMUX signal, e.g. rotated by Rot1, squared and DFT processed SXI1, SXQ1; SYI1, SYQ1 is selected for further processing.

For both X and Y polarization, in the depicted example for the rotated samples X1, Y1, the phase information Phi_x and Phi_y of the selected DFT coefficient corresponding to a spectral line are extracted in the respective phase information extractors ("Angle" blocks) 30 and 31.

Finally, the phase information data Phi_x and Phi_y are summed by the phase information adder 32 to produce an averaged timing phase estimation Phi. Since the absolute phase is irrelevant (as discussed above it is corrected by the MIMO equalizer) there is no need to halve the sum of the two phases. This avoids a division in the cumbersome phase arithmetic.

The gained phase/symbol timing information is used to calculate a phase optimized signal or to correct the timing of the receiver.

The performance of the proposed timing phase estimator has been simulated in the case of return-to-zero polmux Quaternary Phase shift Keying (QPSK) transmission at 112 Gb/s. The the optical signal-to-noise ratio is fixed to 14 dB/0.1 nm and evaluated the variance of the phase estimate in the presence of first order PMD and residual CD. The DGD has been set to half a symbol period; both angles α and δ are set to zero.

Figure 8:
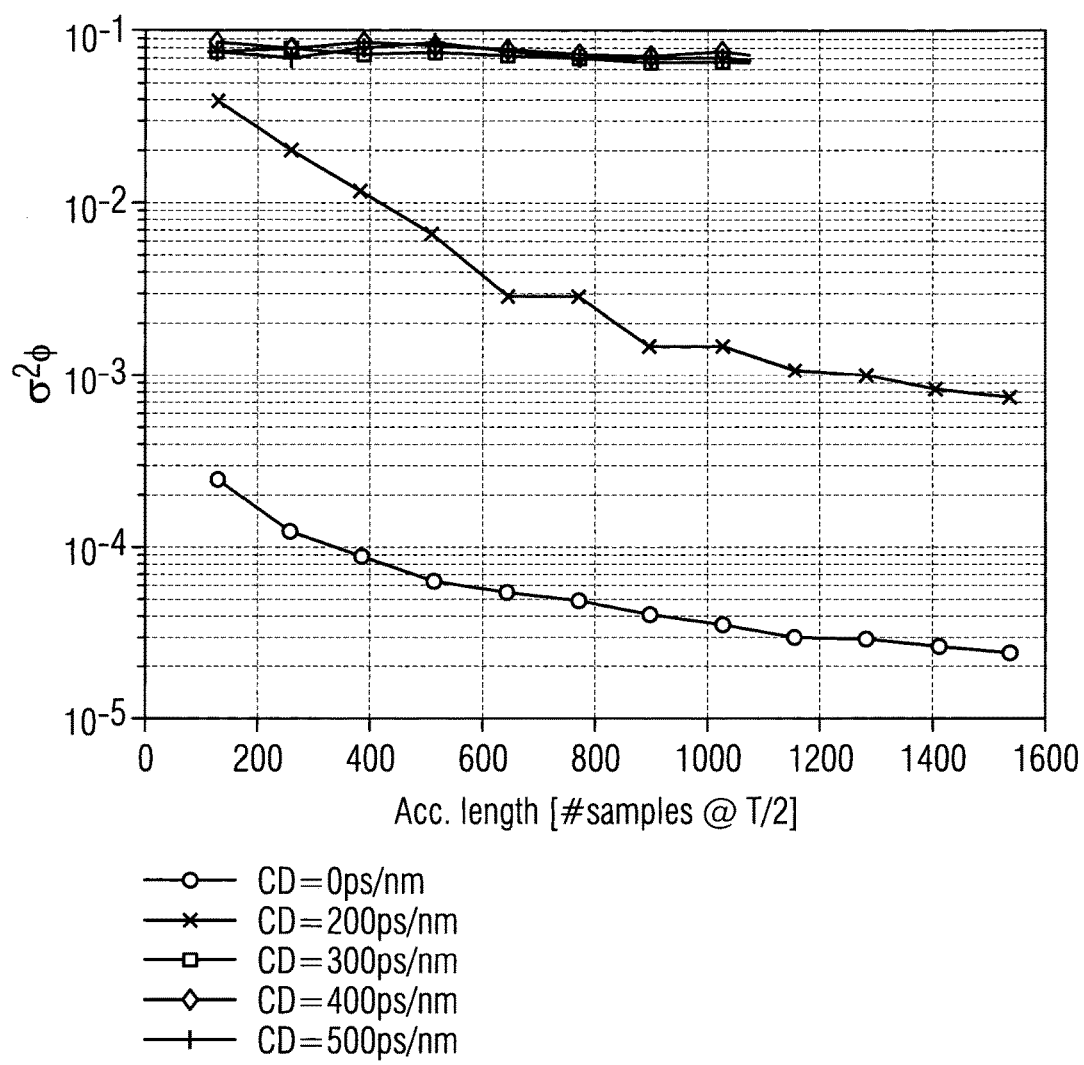
FIG. 8 is a schematic representation of the variance of the phase estimate as a function of the accumulation time for several values of residual CD according to an embodiment of the invention.

FIG. 8 shows the results without prefilter. The phase estimator is able to deliver a reliable phase estimate if the residual CD does not exceed 200 ps/nm. In FIG. 9 the performance improvement in the presence of a simple prefilter consisting of a half-band high-pass finite impulse response filter is shown to suppress low frequency distortions. In this case the CD tolerance of the timing phase extends beyond 400 ps/nm. The slight degradation of the estimate in the absence of CD is due to the imperfect realization of the prefilter and does not impair the overall performance of the coherent receiver. By converse, the improved CD tolerance guarantees a good margin against imperfect tuning of the CD equalizer and transmission impairments that are mitigated only subsequently in the MIMO equalizer.

The present invention is not limited to the details of the above described principles or to the described implementations. The scope of the invention is defined by the appended claims and all changes and modifications as fall within the equivalents of the scope of the claims are therefore to be embraced by the invention. Mathematical conversions or equivalent calculations of the signal values based on the inventive method, the use of analogue signals instead of digital values, parallel or serial processing are also incorporated.

LIST OF ABBREVIATIONS

CD: Chromatic Dispersion
DFT: Discrete Fourier Transform
DGD: Differential Group Delay
MIMO: Multiple Input Multiple Output
PMD: Polarization Mode Dispersion
POLMUX: Polarization multiplexing
QPSK: Quaternary Phase Shift Keying

REFERENCE SIGNS $s_x$ signal with X-polarisation
$s_y$ signal with Y-polarisation x, y received signals with X- and Y-polarisation
$X_t$=XI, XQ (CD comp.) split/POLMUX signal components
$Y_t$=YI, YQ split/POLMUX signal components
X, Y rotated signal components (samples)
X0=XI0, XQ0 rotated signal components (samples)
X1=XI1, XQ1 rotated signal components (samples)
Y0=YI0, YQ0 rotated signal components (samples)
Rot0 rotation parameter
AX0, AX1, AX2 squared in-phase component
AY0, AY1, AY2 squared quadrature component
SXI1, SXQ1 spectral coefficient (in-phase, quadrature component)
Phi phase/symbol timing information
1-4 prefilters
5-8 interpolators
9-11 polarisation rotators
12-17 squarer
18-23 DFT unit
24-26 squarer
27 maximum detector
28, 29 selector circuit
30, 31 phase information extractor
32 phase information adder
33 sample splitter
34 odd-even splitter
35 second odd-even splitter
36-39 summarizers
40, 41 subtractors (subtraction circuits)
42, 43 accumulator

The invention claimed is:

1. A method for retrieving symbol timing information with an apparatus in a POLMUX system, comprising the steps of
 polarisation splitting a received polmux signal with a polarization splitter into two received polmux signal components (x, y; Xt, Yt) with orthogonal polarizations;
 rotating the orthogonal polmux signal components (x, y; Xt, Yt) by fixed rotation parameters (Rot0, Rot1, Rot2) with at least three polarization rotators to obtain at least three pairs of rotated signal components (X0, Y0; X1, Y1; X2, Y2) with different polarizations;
 squaring the obtained rotated signal components (X0, Y0; X1, Y1; X2, Y2) with squarer units and determining a rotated signal component (X1) having the best phase information quality;
 selecting with selectors both corresponding rotated squared signal components (X1, Y1) of the determined signal component (X1) for further processing;
 deriving phase information (Phi_x, Phi_y) of both selected signal components (X1, Y1) with at least one phase information extractor; and
 combining the derived phase information (Phi_x, Phi_y) to achieve the symbol timing information for correcting the phase or calculating an optimized timed signal, wherein the polarization splitter, polarization rotators, squarer units, selectors and at least one phase information extractor are part of the apparatus.

2. The method according to claim 1, wherein the received orthogonal signal components (x, y) are sampled and converted into digital samples (Xt, Yt) of both polarities to be further processed.

3. The method according to claim 1, wherein the received polmux signal components (x, y) and/or sampled polmux signal components (Xt, Yt) are rotated by rotators with fixed parameters.

4. The method according to claim 3, wherein the polmux signal is rotated by three parameters $$\text{Rot0}: \begin{cases} \alpha = 0 \\ \delta = 0 \end{cases}$$

$$\text{Rot1}: \begin{cases} \alpha = \pi/4 \\ \delta = 0 \end{cases}$$

$$\text{Rot2}: \begin{cases} \alpha = \pi/4 \\ \delta = \pi/2 \end{cases}$$

or corresponding parameters
 with α: polarization mixing angle, δ: polarization ellipticity angle.

5. The method according to claim 1, wherein the rotated signal components (X0, X1, X2; Y0, Y1, Y2) are squared and DFT processed for deriving phase information (Phi_x, Phi_y).

6. The method according to claim 5, wherein only the rotated signal components (X0, X1, X2) associated to only one polarity are processed for selecting rotated signal components (X1, Y1) to be processed for determining the phase information (Phi_x, Phi_y).

7. The method according to claim 6, wherein complex coefficients (SXI0, SXQ0; SXI1, SXQ1; SXI2, SXQ2) retrieved by DFT processing of the rotated and squared signal components (X0, X1, X2) are once more squared and gained amplitudes are valuated to determine and to select the rotated signal components (X1, Y1) or the retrieved complex coefficients (SXI0, SXQ0; SXI1, SXQ1; SXI2, SXQ2) with the best phase information quality.

8. The method according to claim 1, wherein the polmux signal components (XI, XQ; YI, YQ) are highpass filtered and/or chromatic dispersion compensated.

9. The method according to claim 1, wherein the rotated signal components (X0, Y0; X1, Y1; X2, Y2) are parallel processed.

10. An apparatus for retrieving symbol timing information in a polmux system including a polarization splitter for splitting a received polmux signal into two received polmux signal components (x, y; Xt, Yt) with orthogonal polarizations, means for sampling and converting a received optical polmux signal into digital samples representing polmux signal components ($X_t$, $Y_t$), the apparatus further comprising
 at least three polarization rotators receiving said polmux signal components ($X_t$, $Y_t$) and outputting at least three rotated complex signal components (X0, Y0; X1, Y1; X2, Y2);
 squarer units receiving said rotated signal components (X0, Y0; X1, Y1; X2, Y2) and outputting amplitudes (AX0, AX1, AX2, AY0, AY1, AY2) of said rotated signal components;
 wherein said apparatus is further configured for selecting both corresponding rotated squared signal components (X1, Y1) of the determined signal component (X1) for further processing;
 deriving phase information (Phi_x, Phi_y) of both selected signal components (X1, Y1); and
 combining the derived phase information (Phi_x, Phi_y) to achieve the symbol timing information for correcting the phase or calculating an optimized timed signal.

11. The apparatus according to claim 10, further comprising

DFT units processing said amplitudes and retrieving complex coefficients (SXI0, SXQ0; SXI1, SXQ1; SXI2, SXQ2; SYI0, SYQ0; SYI1, SXY1; SYI2, SYQ2);

squarers receiving said complex coefficients (SXI0, SXQ0; SXI1, SXQ1; SXI2, SXQ2) of at least one polarity and deriving their amplitudes;

a maximum detector receiving said amplitudes and determining the complex coefficients (SXI1, SXQ1 SYI1, SYQ1) with the best phase information quality;

selector circuits selecting said complex coefficients (SXI1, SXQ1 SYI1, SYQ1);

phase information extractors deriving phase information of the selected complex coefficients (SXI1, SXQ1 SYI1, SYQ1); and a phase information adder calculating the phase information (Phi) for timing processing.

12. The apparatus according to claim 10, further comprising pre-filters receiving polmux signal components (XI, XQ; YI, YQ) and outputting high-pass filtered polmux signal components fed to interpolators or rotators.

13. The apparatus according to claim 11, further comprising interpolators arranged downstream in series of the pre-filters calculating intermediate samples.

14. The method according to claim 5, wherein only complex coefficients (SXI1, SXQ1) retrieved by DFT processing of said rotated Signal components (X1, Y1) associated to only one polarity are processed for selecting the complex coefficients to be processed for determining the phase information (Phi_x, Phi_y).

\* \* \* \* \*